United States Patent
Lubomirsky et al.

(10) Patent No.: US 11,898,220 B2
(45) Date of Patent: Feb. 13, 2024

(54) APPARATUS FOR PLATINUM GROUP METALS RECOVERY FROM SPENT CATALYSTS

(71) Applicant: YEDA RESEARCH AND DEVELOPMENT CO. LTD., Rehovot (IL)

(72) Inventors: Igor Lubomirsky, Petach-Tikva (IL); Valery Kaplan, Rishon LeZion (IL)

(73) Assignee: YEDA RESEARCH AND DEVELOPMENT CO. LTD., Rehovot (IL)

(*) Notice: Subject to any disclaimer, the term of this patent is extended or adjusted under 35 U.S.C. 154(b) by 585 days.

(21) Appl. No.: 16/591,644

(22) Filed: Oct. 3, 2019

(65) Prior Publication Data

US 2020/0032370 A1     Jan. 30, 2020

Related U.S. Application Data

(62) Division of application No. 15/318,459, filed as application No. PCT/IL2015/050621 on Jun. 18, 2015, now Pat. No. 10,457,999.

(Continued)

(51) Int. Cl.
   *C22B 11/06*           (2006.01)
   *C01G 55/00*           (2006.01)
   (Continued)

(52) U.S. Cl.
   CPC ............... *C22B 11/06* (2013.01); *B01J 19/08* (2013.01); *C01G 55/005* (2013.01); *C22B 11/048* (2013.01); *Y02P 10/20* (2015.11)

(58) Field of Classification Search
   CPC .. C22B 1/00; C22B 1/005; C22B 7/00; C22B 7/006; C22B 7/009; C22B 11/06;
(Continued)

(56) References Cited

U.S. PATENT DOCUMENTS

| | | |
|---|---|---|
| 2,828,200 A | 3/1958 | Nixon |
| 2,860,045 A | 11/1958 | Nixon et al. |

(Continued)

FOREIGN PATENT DOCUMENTS

| | | |
|---|---|---|
| CN | 1904094 A | 1/2007 |
| CN | 103258730 | 8/2013 |

(Continued)

OTHER PUBLICATIONS

"Kiln." Merriam-Webster.com Dictionary, Merriam-Webster, https://www.merriam-webster.com/dictionary/kiln. Accessed Feb. 9, 2022. (Year: 2022).*

(Continued)

*Primary Examiner* — Vanessa T. Luk
*Assistant Examiner* — Nikolas Takuya Pullen
(74) *Attorney, Agent, or Firm* — Mark S. Cohen; PEARL COHEN ZEDEK LATZER BARATZ LLP

(57) ABSTRACT

A method for recovery of platinum group metals from a spent catalyst is described. The method includes crushing the spent catalyst to obtain a catalyst particulate material including particles having a predetermined grain size. The method includes subjecting the catalyst particulate material to a chlorinating treatment in the reaction zone at a predetermined temperature for a predetermined time period by putting the catalyst particulate material in contact with the chlorine containing gas. The method also includes applying an electromagnetic field to the chlorine-containing gas in the reaction zone to provide ionization of chlorine; thereby to cause a chemical reaction between platinum group metals and chlorine ions and provide a volatile platinum group metal-containing chloride product in the reaction zone. Following this, the volatile platinum group metal-containing chloride product is cooled to convert the product into solid phase platinum group metal-containing materials.

12 Claims, 2 Drawing Sheets

Related U.S. Application Data

(60) Provisional application No. 62/136,762, filed on Mar. 23, 2015, provisional application No. 62/014,209, filed on Jun. 19, 2014.

(51) Int. Cl.
*B01J 19/08* (2006.01)
*C22B 11/00* (2006.01)

(58) Field of Classification Search
CPC ....... C22B 11/12; C22B 11/00; C22B 11/042; C22B 11/044; C22B 11/046; C22B 11/048; C22B 11/04; C22B 11/026; F27B 7/00; F27B 7/10
See application file for complete search history.

(56) References Cited

U.S. PATENT DOCUMENTS

| | | | |
|---|---|---|---|
| 3,021,209 A | 2/1962 | Murray et al. | |
| 3,951,648 A | 4/1976 | Stern et al. | |
| 4,074,865 A | 2/1978 | Gibbon | |
| 4,353,740 A | 10/1982 | Dunn | |
| 4,960,573 A | 10/1990 | Okutani et al. | |
| 5,102,632 A | 4/1992 | Allen et al. | |
| 5,104,445 A | 4/1992 | Dubrovsky et al. | |
| 6,455,018 B1 | 9/2002 | Cuif | |
| 7,972,412 B2 | 7/2011 | Bergeron et al. | |
| 8,852,547 B2 | 10/2014 | Ma et al. | |
| 8,974,572 B2 | 3/2015 | Uehara et al. | |
| 2007/0131058 A1* | 6/2007 | Bergeron | C22B 11/06 75/631 |
| 2008/0083300 A1 | 4/2008 | Evans | |
| 2009/0226352 A1 | 9/2009 | Hsu et al. | |
| 2016/0145714 A1 | 5/2016 | Liddell et al. | |
| 2017/0145542 A1 | 5/2017 | Lubomirsky et al. | |

FOREIGN PATENT DOCUMENTS

| | | | |
|---|---|---|---|
| CN | 107742760 A | 2/2018 | |
| CN | 109652655 A | 4/2019 | |
| DE | 4429895 A1 * | 2/1995 | ............... C10B 1/10 |
| GB | 798712 A | 7/1958 | |
| JP | S50-32018 A | 3/1975 | |
| JP | S51-123723 A | 10/1976 | |
| JP | 02301528 A | 12/1990 | |
| JP | H-03-13532 A | 1/1991 | |
| JP | 2012219326 A | 12/2012 | |
| KR | 100959928 B1 * | 5/2010 | ................ C02F 1/50 |
| WO | WO 99022036 A1 * | 5/1999 | ......... C22B 34/1209 |
| WO | WO 2015/193901 A1 | 12/2015 | |
| WO | WO 2018/078632 A1 | 5/2018 | |

OTHER PUBLICATIONS

Andreas Renzel, Overview UV-lamps, Apr. 16, 2012, UV-Technik Meyer GMBH (Year: 2012).*

Cosmos: The SAO Encyclopedia: The Electromagnetic Spectrum, Aug. 30, 2007, Swineburne University of Technology (Year: 2007).*

International Search Report for PCT Application No. PCT/IL2015/050621 dated Sep. 21, 2015.

Park et al. "Platinum Etching in an Inductively Coupled Plasna" In Solid State Device Research Conference, 1996. ESSDERC'96. Proceedings of the 26th European Sep. 9, 1996 (pp. 631-634). IEEE.

Pietrelli et al. "Automotive spent catalysts treatment and platinum recovery" International Journal of Environment and Waste Management. Jan. 1, 2013;11(2):222-32.

Schwartz, Harold "Prokon Showme Software" The Calculation Companion (Year 1997).

Supplementary European Search Report for European Application No. EP15810012.3 dated Nov. 27, 2017.

Yu, Yong, et al. "Progress of Platinum Group Metals Recovery from Spent Carrier Catalysts [J]." Hebei Chemical Industry 2 (2011).

Itakura et al. "Resource recovery from Nd—Fe—B sintered magnet by hydrothermal treatment" Journal of Alloys and Compounds. Feb. 9, 2006;408:1382-5.

Kamimoto et al. "Electrodeposition of rare-earth elements from neogymium magnets using molten salt electrolysis" Journal of Material Cycles and Waste Management. Oct. 2018;20(4):1918-22.

Lloyd DD. "Standard sieves and Mesh sizes" Analytical Chemistry Resources. The University of The West Indies. 2000, 4 pages; including Appendix 'Standard sieves and Particle size conversions' (4 pages).

Office Action for Chinese Patent Application No. 20188007137.8 (English translation) dated Sep. 29, 2021.

Office Action for Chinese Patent Application No. 201880071337.8 (English translation) dated Apr. 20, 2022.

Shirayama et al. "Selective extraction and recovery of Nd and Dy from Nd—Fe—B magnet scrap by utilizing molten MgCl2" Metallurgical and Materials Transactions B. Jun. 2018;49(3):1067-77.

Xu et al. "Supported Acidic Photocatalystic Materials and Applications" Northeast Normal University Press 2015, pp. 77-78. (English translation not available).

Zhang et al. "Gold Extraction Technology" 2013 Beijing: Metallurgical Industry Press. (English translation not available).

Zhang et al. "Modern Gold Smelthing Technology" 2014 Beijing: Metallurgical Industry Press. (English translation not available).

Assefi et al. "Pyrometallurgical recycling of Li-ion, Ni—Cd and Ni-MH batteries: A minireview" Current Opinion in Green and Sustainable Chemistry. Aug. 1, 2020;24:26-31.

Dong et al. "Recovery of platinum group metals from spent catalysts: a review" International Journal of Mineral Processing. Dec. 10, 2015;145:108-13.

Frayne C. "Boiler water treatment: principles and practice" Chemical Publishing Company; 2002.

Hoffmann JE. "Recovery of platinum-group metals from grabbroic rocks metals from auto catalysts" JOM. Jun. 1988;40(6):40-4.

Hu et al. "A promising approach for the recovery of high value-added metals from spent lithium-ion batteries" Journal of Power Sources. May 31, 2017;351:192-9.

* cited by examiner

APPARATUS FOR PLATINUM GROUP METALS RECOVERY FROM SPENT CATALYSTS

CROSS-REFERENCE TO RELATED APPLICATIONS

This application is a Divisional Application of U.S. patent application Ser. No. 15/318,459 filed Dec. 13, 2016 which is a National Phase Application of PCT International Application No. PCT/IL2015/050621, International Filing Date Jun. 18, 2015, claiming priority of United States Provisional Patent Application No. 62/014,209, filed Jun. 19, 2014, and 62/136,762, filed Mar. 23, 2015, which are incorporated in their entirety herein by reference.

FIELD OF THE INVENTION

The present invention relates to metallurgical techniques employed for separation and recovery of precious and rare metals, and specifically, to an apparatus and method for recovery of platinum group metals from spent catalysts.

BACKGROUND OF THE INVENTION

Platinum group metals, e.g., platinum (Pt), palladium (Pd) and rhodium (Rh), are well-known precious metals playing an important role in many industrial applications such as jewelry and ornaments, electronics, telephone circuits, dental alloys, etc. Platinum and palladium have also long been used as reforming and hydrogenation catalysts in the petroleum or automobile industries, respectively. In the catalysts, small amounts of platinum or palladium are contained in large volumes of support materials, typically as a metal coat supported on alumina, zirconia or silica.

The petroleum or automobile industry catalysts containing platinum or palladium are usually discarded when its catalytic function deteriorates. Palladium content in the catalysis usually varies from 0.4 mass percent to 5.0 mass percent. Likewise, platinum, ruthenium and osmium content can vary from 0.1 mass percent to 0.5 mass percent. The spent catalysts may also contain 1.5-2.5 mass percent of rhenium and 3.0-5.0 mass percent of vanadium. Due to its low natural abundance, high price and increasing demands in various fields of industry, recovering and refining platinum group metals from various spent materials can be highly advantageous. Therefore, efficient recovery and purification of precious metals from spent catalysts has economic benefits.

Platinum and palladium in spent petroleum or automobile industry catalysts can be recovered through various hydrometallurgical or pyrometallurgical techniques. A hydrometallurgical treatment generally includes crushing (e.g., grinding and milling), leaching, filtration, and washing stages, which are followed by extraction of palladium from a solution (cementation or electrochemical process). The treatment may also include neutralization of the acid waste solution, filter cakes and acid off-gases.

For example, U.S. Pat. No. 6,455,018 describes a complex non-selective process for extraction of precious metals, e.g., platinum, palladium and rhodium from spent catalytic converters by grinding the catalysts, treating with sulphuric acid; calcination of the mixture between 150° C. and 450° C., leaching with chlorides and hydrochloric acid to obtain a solution of noble metals and any other metals along with a solid residue.

Basically, there are three process routes for hydrometallurgical treatment. The first route includes partial destruction of the alumina or zirconia catalyst support substrate and high-temperature chloritization with chlorine gas. In this case, palladium is completely transformed and the support substrate is partially transformed into solution or melt. Platinum or palladium can, for example, be extracted directly from a catalyst support substrate using leachates. As such, the catalyst can, for example, be leached in aqua regia or in hydrochloric acid with oxidants such as nitric acid, sodium chlorate, sodium hypochlorite and chlorine gas.

The second route includes full destruction of the alumina or zirconia catalyst support substrate. In this route, palladium and alumina are transformed into the solution or melt together. This route is based on total dissolution of the alumina substrate, thereby concentrating insoluble or sparingly soluble platinum and palladium into the residue.

The third route includes the processes of selected dissolution of palladium in solutions or in a metal collector with additional metal separation and palladium extraction without destruction of the alumina or zirconia catalyst substrate. In this case, palladium is completely transformed into solution or melt, whereas alumina remains in an insoluble form.

The disadvantages of conventional hydrometallurgical processes for recovery of platinum group metals from catalysts are associated with multistage processes, formation of large amounts of waste acidic or alkaline solutions. Likewise, these processes require a relatively great quantity of a metal-collector (e.g., Zn or Al) for extraction of the platinum group metals from the solution in the cementation stage of the process, usually in an amount of 7-8 times greater than the stoichiometric amount.

A conventional pyrometallurgical treatment of catalysts for recovery of platinum group metals generally includes a grinding (crushing and milling) stage and a smelting stage, followed by metal separation and palladium extraction from metal-collectors, for example, by an electrochemical process, along with slag treatment and neutralization of acid off-gases.

Precious metals within spent petroleum or automobile industry catalysts can also be recovered by chlorination at high temperature.

For example, U.S. Pat. No. 3,951,648 describes a process for recovering palladium from a spent catalyst having a palladium content of less than 5 percent. The method comprises putting the catalyst in contact with a gaseous chlorinated organic compound at a temperature sufficient for vaporizing the palladium and cooling the gaseous phase so as to recover the formed chlorinated palladium derivative.

U.S. Pat. No. 5,102,632 describes a two-stage method of recovering the noble metal content of a mixture of noble metals, e.g., platinum, palladium, and rhodium, from a spent catalyst. The method comprises first reductive chlorination at an elevated temperature by a gaseous chlorinating agent in the presence of a reducing agent (e.g., sulfur dioxide and carbon monoxide in stages). The method also comprises minimizing the amount of aluminum trichloride formed from either washcoat or underlying ceramic chlorination, and separating the aluminum trichloride or other washcoat chlorides from the products of chlorination of the noble metals, as by sublimation of the former in a reducing atmosphere at a temperature below the vaporization temperatures of the latter, thereby recovering the noble metal chlorides in a concentrated form. As a second stage, temperature is further increased in an atmosphere of chlorine alone, to volatilize rhodium trichloride for collection separately from the palladium and platinum chlorides volatilized previously in the first-stage reductive chlorination.

Despite prior art in the area of treatment of spent catalysts, there is still a need in the art for further improvement of a technique for recycling spent catalysts from the petrochemical, chemistry and automobile industries for recovery of platinum group metals from spent catalysts.

It would also be advantageous to have a method and apparatus for recovery of platinum group metals with low environmental impact agents able to extract palladium and/or other platinum group metals selectively and efficiently in mild conditions.

It would still be advantageous to have a method and apparatus for recovery of platinum group metals which can be easily industrialized and which would result in significant yield of the recovered metals.

The present disclosure satisfies the aforementioned need by providing a method for recovery of platinum group metals from a spent catalyst that includes one or more platinum group metals.

SUMMARY OF THE INVENTION

In one embodiment, this invention provides a method for recovery of platinum group metals from a spent catalyst, the method comprising:
  crushing said spent catalyst to obtain a catalyst particulate material including particles having a predetermined grain size;
  providing a chlorine containing gas and supplying thereof to a reaction zone;
  subjecting the catalyst particulate material to a chlorinating treatment in the reaction zone at a predetermined temperature for a predetermined time period by putting the catalyst particulate material in contact with the chlorine containing gas to yield a volatile platinum group metal containing chloride;
  optionally applying an electromagnetic field to the chlorine-containing gas in the reaction zone to provide ionization of chlorine; thereby to cause a chemical reaction between platinum group metals; and
  cooling said volatile platinum group metal-containing chloride product to convert said volatile platinum group metal-containing chloride product into solid phase platinum group metal-containing materials.

In one embodiment, this invention provides an apparatus for recovery of platinum group metals from a spent catalyst comprising:
  a catalyst particulate material inlet port;
  a chlorinartion reactor with a reaction zone;
  a chlorine-containing gas inlet port;
  a heater;
  optionally an electromagnetic inductor;
  platinum group metal-containing vapor outlet port and one or more corresponding cooling manifolds through which a platinum group metal-containing vapor is released from the reaction zone;
wherein
  a catalyst particulate material is fed into the catalyst particulate material inlet port and is being treated with chlorine containing gas from the chlorinated reactor at a predetermined temperature by the heater, providing a chemical reaction between platinum group metals and the chlorine-containing gas to yield a volatile platinum group metal-containing chloride product.

In the present description and claims, the expression "platinum group metals" is broadly used, whether alone or in combination, to refer to all elements of the platinum group, namely the elements rhodium, palladium, iridium, platinum, ruthenium and osmium.

According to an embodiment of the present invention, the method includes crushing the spent catalyst to obtain a catalyst particulate material including particles having a predetermined grain size. For example, the predetermined grain size of said catalyst particulate material can be in the range of 100 microns to 300 mm.

According to an embodiment of the present invention, the method includes providing a chloride aqueous solution and impregnating the catalyst particulate material with the chloride aqueous solution.

According to an embodiment, the impregnating of the catalyst particulate material with the chloride aqueous solution includes soaking the catalyst particulate material in the chloride aqueous solution until the catalyst particulate material is steeped.

According to an embodiment, the providing of the chloride aqueous solution includes dissolving at least one chloride salt and at least one hypochlorite salt in water. A concentration of one or more chloride salts in the chloride aqueous solution can, for example, be in the range of about 15 weight percent to about 40 weight percent, whereas a concentration of one or more hypochlorite salts can, for example, be in the range of about 5 weight percent to about 15% weight percent.

According to some embodiments of the present invention, the chloride salts are selected from alkaline metals chlorides, alkaline earth metals chlorides, aluminum chloride and/or ammonium chloride, whereas the hypochlorite salts are selected from hypochlorite salts of alkaline metals and/or hypochlorite salts of alkaline earth metals.

The method also includes providing a chlorine containing gas and supplying thereof to a reaction zone.

According to an embodiment, the chlorine containing gas can be produced from a chlorine-containing material by heating the chlorine-containing material in a chlorine production zone at a decomposition temperature of the chlorine-containing material. The decomposition temperature causes thermal decomposition of the chlorine-containing material, thus producing chlorine-containing gas.

Examples of a chlorine-containing material suitable for producing a chlorine-containing gas include, but are not limited to, potassium hypochlorite, sodium hypochlorite, calcium hypochlorite, magnesium hypochlorite, barium hypochlorite, potassium chloride-hypochlorite, sodium chloride-hypochlorite, calcium chloride-hypochlorite, magnesium chloride-hypochlorite, barium chloride-hypochlorite, potassium chloride, sodium chloride, ammonium chloride, calcium chloride, magnesium chloride, barium chloride, aluminum chloride, hydrochloric acid and any combination thereof.

According to an embodiment, the heating of the chlorine-containing material is carried out at a temperature in the range of 150 degrees Celsius to 800 degrees Celsius for a time period in the range of 5 min to 120 min.

According to an embodiment, the chlorine-containing material is a composition of calcium hypochlorite and calcium chloride. For example, an amount of calcium hypochlorite in the composition of calcium hypochlorite and calcium chloride can be in the range of 5 to 80 weight percent.

According to an embodiment, the method for recovery of platinum group metals from a spent catalyst includes subjecting the catalyst particulate material to a chlorinating treatment in the reaction zone at a predetermined temperature for a predetermined time period by putting the catalyst particulate material in contact with the chlorine containing gas.

According to one embodiment of the present invention, the catalyst particulate material subjected to a chlorinating treatment is taken directly after crushing the spent catalyst.

According to another embodiment of the present invention, the catalyst particulate material subjected to a chlorinating treatment is taken after its impregnation with the chloride aqueous solution.

An amount of the chlorine in the chlorine containing gas is in the range of 1 gram to 200 grams per each kilogram of the spent catalyst. The predetermined temperature in the reaction zone can, for example, be in the range of 300 degrees Celsius to 1100 degrees Celsius. The predetermined time period for heating the catalyst particulate material is in the range of 10 min to 120 min.

According to an embodiment, the method for recovery of platinum group metals includes applying an electromagnetic field to the chlorine-containing gas in the reaction zone to provide ionization of chlorine; thereby to cause a chemical reaction between platinum group metals and chlorine ions and provide a volatile platinum group metal-containing chloride product in the reaction zone. Ionization of the chlorine gas can, for example, be achieved by applying an alternating electromagnetic field to the reaction zone at a frequency in the range of 50 kHz to 12 GHz. An irradiance of the electromagnetic field in the reaction zone can, for example, be in the range of 0.1 kW/cm$^2$ to 10 kW/cm$^2$. An irradiance of the electromagnetic field applied to the reaction zone can, for example, be in the range of 0.1 kW/cm$^2$ to 10 kW/cm$^2$. The electromagnetic field can, for example, be applied to the chlorine-containing gas mixture to provide ionization of chlorine, carried out for a time period in the range of 5 min to 180 min.

According to an embodiment, the heating of the catalyst particulate material in the reaction zone is carried out simultaneously with applying of an electromagnetic field to the chlorine-containing gas mixture.

The method then includes cooling the volatile platinum group metal-containing chloride product to convert the volatile platinum group metal-containing chloride product into solid phase platinum group metal-containing materials.

There has thus been outlined, rather broadly, the more important features of the invention so that the detailed description thereof that follows hereinafter may be better understood, and the present contribution to the art may be better appreciated. Additional details and advantages of the invention will be set forth in the detailed description.

BRIEF DESCRIPTION OF THE DRAWING

In order to understand the invention and to see how it may be carried out in practice, embodiments will now be described, by way of non-limiting example only, with reference to the accompanying drawings, in which.

Figure 1:
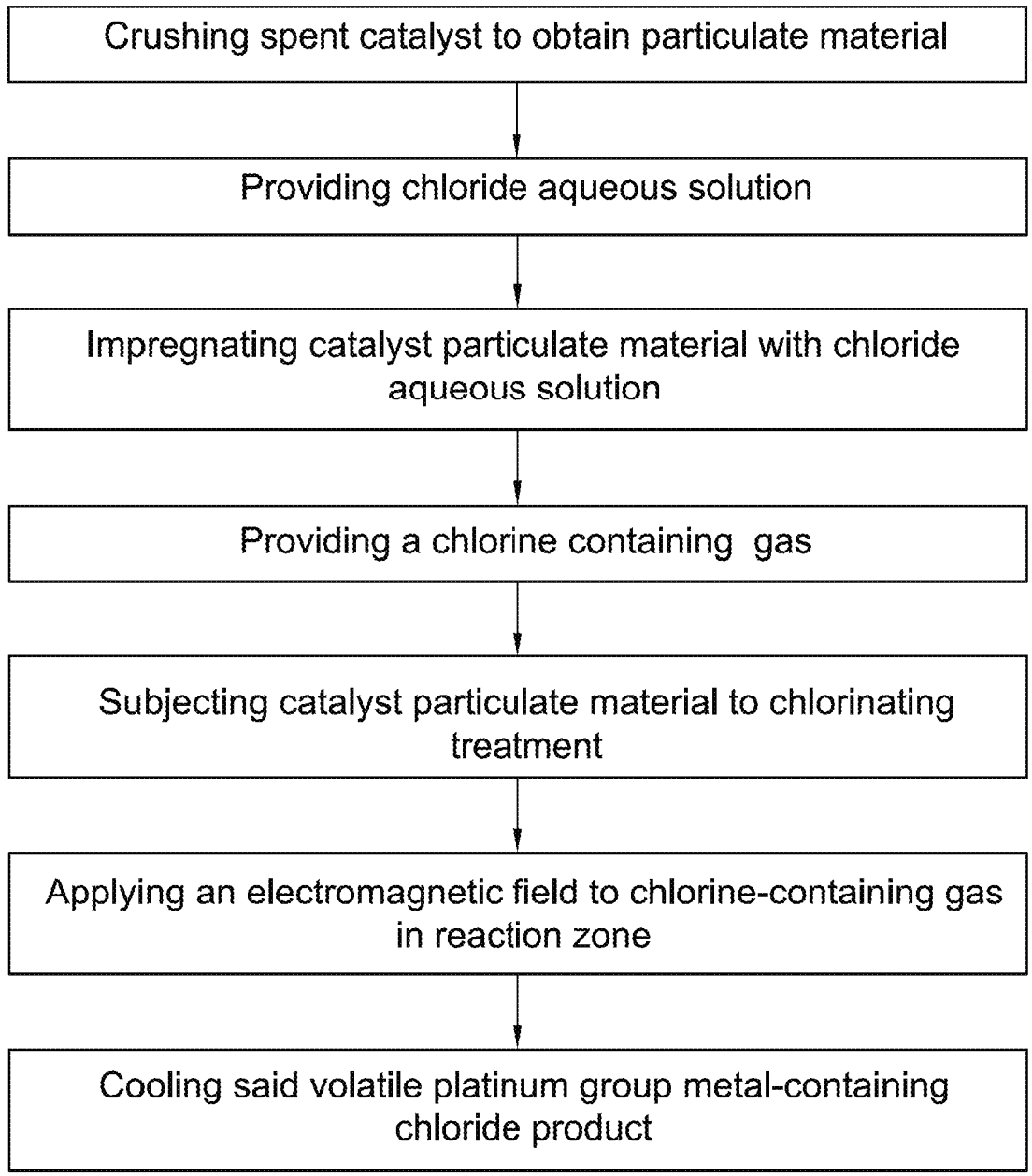
FIG. 1 is a schematic presentation of a method for recovery of platinum group metals from a spent catalyst.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The principles and operation of an apparatus for recovery of platinum group metals from a spent catalyst according to the present invention may be better understood with reference to the drawings and the accompanying description. It should be understood that these drawings are given for illustrative purposes only and are not meant to be limiting.

In one embodiment, this invention provides a method for recovery of platinum group metals from a spent catalyst, the method comprising:

crushing said spent catalyst to obtain a catalyst particulate material including particles having a predetermined grain size;

providing a chlorine containing gas and supplying thereof to a reaction zone;

subjecting the catalyst particulate material to a chlorinating treatment in the reaction zone at a predetermined temperature for a predetermined time period by putting the catalyst particulate material in contact with the chlorine containing gas to yield a volatile platinum group metal containing chloride;

optionally applying an electromagnetic field to the chlorine-containing gas in the reaction zone to provide ionization of chlorine; thereby to cause a chemical reaction between platinum group metals; and cooling said volatile platinum group metal-containing chloride product to convert said volatile platinum group metal-containing chloride product into solid phase platinum group metal-containing materials.

In the present description and claims, the expression "platinum group metals" is broadly used, whether alone or in combination, for all of the elements of the platinum group, namely the elements rhodium, palladium, iridium, platinum, ruthenium and osmium.

The spent catalysts, which contain the platinum group metals to be recovered, may be in various forms, namely, for example, in the form of pellets or in the form of monoliths. It will be appreciated that such catalysts are widely described in the art, both with respect to their structure and their composition, and therefore they are not described here.

The spent catalysts generally may contain various impurities, such as zirconia, silica, ceria, alumina, carbonaceous substances and the like. However, the method and apparatus of the invention are insensitive to the presence of these impurities.

Referring to FIG. 1, according to an optional stage of the method of the present invention, crushing of the spent catalyst is first carried out. This stage is required when a spent catalyst is in the form of a monolith. During the crushing, the catalyst is grinded, and thus converted into a particulate material whose mean particle size may range, for example from 100 microns to 300 millimeters. This state enables preparation of a product which is, on the one hand, more homogeneous and, on the other, more treatable in the subsequent method steps, according to the present invention. In another embodiment, the particulate material has mean particle size between 100 microns to 200 millimeters. In another embodiment, the particulate material has mean particle size between 100 microns to 100 millimeters. In another embodiment, the particulate material has mean particle size between 100 millimeters to 300 millimeters.

According to an embodiment of the present invention, the method includes providing a chloride aqueous solution. The chloride aqueous solution is prepared by dissolving one or more chloride salts and one or more hypochlorite salts in water.

According to an embodiment of the present invention, a concentration of chloride salts in the chloride aqueous solution is in the range of about 15 weight percent to about 40 weight percent, whereas a concentration of hypochlorite salts is the range of about 5 weight percent to about 15% weight percent. In another embodiment, the concentration of chloride salts in the chloride aqueous solution is in the range of about 15 weight percent to about 25 weight percent.

The chloride salts can, for example, be selected from alkaline metal chlorides, alkaline earth metal chlorides, aluminum chloride and/or ammonium chloride. The hypochlorite salts can, for example, be selected from hypochlorite salts of alkaline metals and/or hypochlorite salts of alkaline earth metals.

Examples of chloride salts of alkaline metals include, but are not limited to, potassium chloride and sodium chloride. Examples of chloride salts of chlorides of alkaline earth metals include, but are not limited to, calcium chloride, magnesium chloride and barium chloride.

Examples of hypochlorite salts of alkaline metals include, but are not limited to, potassium hypochlorite, sodium hypochlorite, potassium chloride-hypochlorite and sodium chloride-hypochlorite. Examples of hypochlorite salts of alkaline earth metals include, but are not limited to, calcium hypochlorite, magnesium hypochlorite, barium hypochlorite, calcium chloride-hypochlorite, magnesium chloride-hypochlorite, and barium chloride-hypochlorite.

According to an embodiment of the present invention, the method includes impregnating the catalyst particulate material with the chloride aqueous solution. Such impregnation of the catalyst particulate material with the chloride aqueous solution can for example be carried out by soaking the catalyst particulate material in a chloride aqueous solution. Such soaking of the catalyst particulate material in a chloride aqueous solution can, for example, be at atmospheric pressure and room temperature until the catalyst particulate material is fully steeped. For example, such soaking can be for a duration of at least 10 minutes. An amount of the chloride aqueous solution can, for example, be in the range of 50 weight percent to 180 weight percent of the dry catalyst particulate material. In another embodiment, the amount of the chloride aqueous solution is in the range of 50 weight percent to 100 weight percent of the dry catalyst particulate material. In another embodiment, the amount of the chloride aqueous solution is in the range of 75 weight percent to 125 weight percent of the dry catalyst particulate material.

According to an embodiment of the present invention, the method includes providing a chlorine containing gas and supplying the gas to a reaction zone.

According to an embodiment, the providing of a chlorine containing gas includes producing the chlorine containing gas from a chlorine-containing material. Examples of chlorine-containing materials suitable for the present invention include, but are not limited to, potassium hypochlorite, sodium hypochlorite, calcium hypochlorite, magnesium hypochlorite, barium hypochlorite, potassium chloride-hypochlorite, sodium chloride-hypochlorite, calcium chloride-hypochlorite, magnesium chloride-hypochlorite, barium chloride-hypochlorite, potassium chloride, sodium chloride, ammonium chloride, calcium chloride, magnesium chloride, barium chloride, aluminum chloride, hydrochloric acid and any combination thereof. The chlorine-containing material can, for example, be in a particulate form. For example, the amount of the chlorine-containing material can be in the range of 1 gram to 1 kilogram per kilogram of the spent catalyst.

When a combination of two or more different chlorine-containing materials is used, a concentration of the components in the composition can be varied in broad limits. For example, when the chlorine-containing material is a composition of calcium hypochlorite together with calcium chloride, an amount of calcium hypochlorite in the composition of calcium hypochlorite and calcium chloride can be in the range of 5% to 80% weight percent.

The providing of the chlorine containing gas further includes treating the chlorine-containing material in a suitable reactor having a decomposition zone for heating the chlorine-containing material to provide thermal decomposition thereof, thus producing a chlorine-containing gas mixture. The temperature and duration of the heating are chosen to provide thermal decomposition of the chlorine-containing material, and produce a chlorine-containing gas mixture. For example, the predetermined temperature can be in the range of about 150° C. to about 400° C. The heating of the mixture to provide thermal decomposition of the chlorine-containing material for producing a chlorine-containing gas mixture can be carried out for a time period in the range of 5 min to 120 min.

According to some embodiments of the present invention, the method for recovery of platinum group metals from a spent catalyst includes subjecting the catalyst particulate material to a chlorinating treatment in the reaction zone at a predetermined temperature for a predetermined time period by putting the catalyst particulate material in contact with a chlorine containing gas.

According to one embodiment of the present invention, the catalyst particulate material subjected to a chlorinating treatment is taken directly after crushing the spent catalyst.

According to another embodiment of the present invention, the catalyst particulate material subjected to a chlorinating treatment is taken after its impregnation with the chloride aqueous solution.

It was found by the applicant of the present invention that the embodiment of the method, including the step of impregnating the catalyst particulate material with the chloride aqueous solution, provides more effective recovery of platinum group metals from spent catalysts than the embodiment when the chlorinating treatment is taken directly after crushing the spent catalyst. Furthermore, it was found that the recovery yield is greater when the chloride aqueous solution includes both at least one chloride salt and at least one hypochlorite salt in water, than only chloride salts or only hypochlorite salts.

In one embodiment, this invention provides an apparatus for recovery of platinum group metals from a spent catalyst comprising:

a catalyst particulate material inlet port;
    a chlorinartion reactor with a reaction zone;
    a chlorine-containing gas inlet port;
    a heater;
    optionally an electromagnetic inductor;

platinum group metal-containing vapor outlet port and one or more corresponding cooling manifolds through which a platinum group metal-containing vapor is released from the reaction zone;

wherein a catalyst particulate material is fed into the catalyst particulate material inlet port and is being treated with chlorine containing gas from the chlorinated reactor at a predetermined temperature by the heater, providing a chemical reaction between platinum group metals and the chlorine-containing gas to yield a volatile platinum group metal-containing chloride product.

Figure 2:
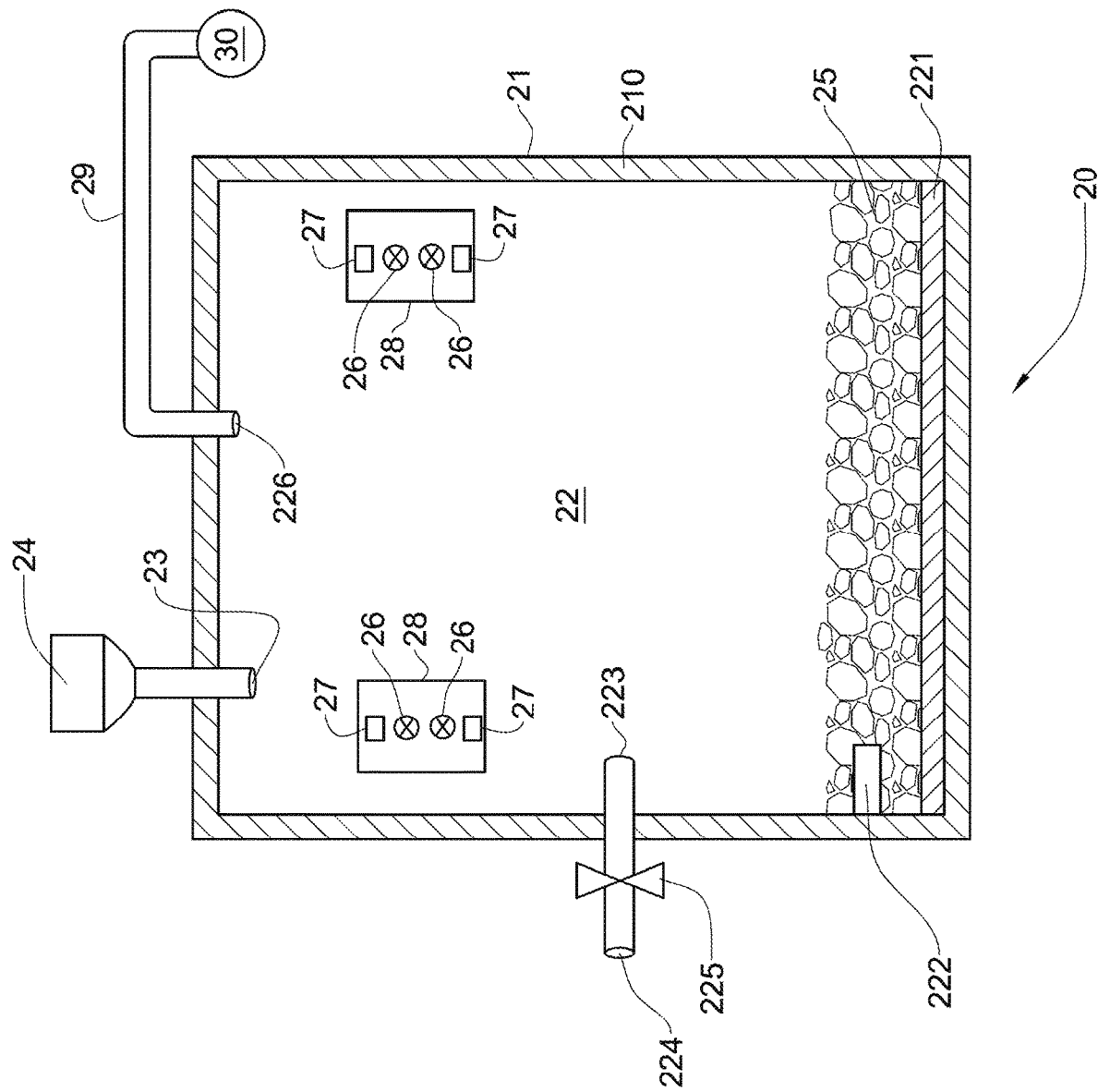
FIG. 2 illustrates a schematic fragmentary longitudinal cross-sectional view of an apparatus for recovery of platinum group metals from a spent catalyst, according to an embodiment of the present invention.

FIG. 2 illustrates a schematic longitudinal cross-sectional view of an apparatus for treatment of a catalyst particulate material, according to an embodiment of the present invention. The treatment is carried out by heating the mixture in a chlorine atmosphere and applying an electromagnetic field, according to an embodiment of the present invention.

It should be noted that this figure is not to scale, and is not in proportion, for purposes of clarity. It should also be noted that the blocks, as well other elements in this figure, are intended as functional entities only, such that the functional relationships between the entities are shown, rather than any physical connections and/or physical relationships. Examples of constructions, materials, dimensions, and manufacturing processes are provided for selected elements. Those versed in the art should appreciate that many of the examples provided have suitable alternatives which may be utilized.

According to an embodiment of the present invention, the apparatus 20 for treatment of a catalyst particulate material 25 includes a housing 21 having housing walls 210. The term "housing" is broadly used to describe any container, tank, chamber, vessel, cartridge, surrounding housing, frame assembly or any other structure that can be used for carrying out a process for recovery of platinum group metals from a spent catalyst, in accordance with the teaching of the present invention.

The housing walls 210 define a chlorination reactor 22 with a reaction zone in which the mixture is heated and subjected to an electromagnetic field. It should be understood that the housing 21 may have any desired dimension and shape, such as cylindrical, prismatic, etc. Moreover, the dimension of the cavities may have any desired size distribution.

An inner surface of the housing walls 210 may be made from any suitable materials. Examples of such materials include, but are not limited to, a ceramic material containing at least one element selected from silica-based, alumina-based, magnesia-based or zirconia-based ceramic materials and any combination thereof.

A catalyst particulate material can be fed into the chlorination reactor 22 in various suitable ways. For example, it can be provided through a feeding inlet 23 arranged in the housing walls 210. For this purpose, a feed-hopper 24 can, for example, be arranged at the feeding inlet 23. Although feeding inlet 23 is shown in FIG. 2 at a top of the housing 21, generally it can be arranged in any suitable place.

According to some embodiments, the reactor 22 includes a heater 221 configured to heat and maintain the catalyst particulate material at a predetermined temperature. The thermal treatment can, for example, be useful for transferring the alumina catalyst substrate from the soluble form $\gamma$-$Al_2O_3$ into the insoluble form $\alpha$-$Al_2O_3$. The thermal pre-treatment can render the platinum group metals to be more reactive, by removing any oxide layer which may coat the platinum group metals. The thermal treatment can, for example, be in the range from 300 degrees Celsius to 1100 degrees Celsius for a predetermined time period. The predetermined time period for heating the catalyst particulate material can, for example, be in the range of 10 min to 120 min.

According to some embodiments, the chlorination reactor 22 can also include a temperature sensor 222 arranged in the reactor 22 within the mixture and configured for measuring the predetermined temperature for controlling operation of the heater 221.

As shown in FIG. 2, the reactor 22 includes a chlorine-containing gas inlet port 223 associated with an chlorine-containing gas inlet manifold 224 arranged in the housing walls 210, and configured for receiving a chlorine-containing gas, and directing a predetermined amount of the chlorine-containing gas into the reaction zone. The chlorine-containing gas can, for example, be a gas mixture of chlorine and a noble gas, such as argon; however, the gas mixture can also include atmospheric air. It was found by the applicant of the present invention that when the chlorine-containing gas includes oxygen (e.g., oxygen presented in the air), the final result of recovery of platinum group metals from spent catalysts is more effective than in the case when oxygen is not present in the gas mixture. A chlorine content in the chlorine containing gas can, for example be in the range of 0.1 weight percent to 95 weight percent, whereas an oxygen content in the chlorine containing gas can, for example, be in the range of 0.1 weight percent to 25 weight percent.

According to an embodiment of the present invention, the chlorine-containing gas is provided from the reactor (not shown) where a chlorine-containing material has been subjected to thermal treatment and decomposition for producing the chlorine-containing gas.

According to another embodiment of the present invention, the chlorine-containing gas is provided from a storage tank where (not shown) the chlorine-containing gas can be stored at high pressure.

In operation, the chlorine-containing gas can pass through the reaction zone and be in contact with the catalyst particulate material. An amount of the chlorine-containing gas that is passed through the reaction zone can, for example, be in the range of 0.2 litres to 15 litres chlorine per kilogram of the catalyst particulate material. The chlorine-containing gas can, for example, pass through the reaction zone during heating.

When desired, a chlorine-containing gas inlet valve 225 can be arranged within the chlorine-containing gas inlet manifold 224. The chlorine-containing gas inlet valve 225 can be configured for regulating the ingress flow rate of the chlorine-containing gas. The term "valve" as used in the present description has a broad meaning and relates to any electrical and/or mechanical device adapted to regulate the flow rate of gases and liquids.

Turning back to FIG. 1, the method for recovery of platinum group metals from a spent catalyst includes applying an electromagnetic field to the chlorine-containing gas in the reaction zone to provide ionization of chlorine.

Formation of chloride of noble metals is a kinetically limited process. It is known that when chlorine is present as an active radical, (e.g., in an aqua regia solution) chlorination is more rapid than when chlorination is carried out with chlorine molecules. Therefore, bringing platinum group metals into contact with a chlorine plasma (ions and radicals of chlorine instead of chlorine molecules) can also accelerate the chlorination process, such as Pd metal+2Cl$^{-1}$=PdCl$_2$ sublimate Pt metal+4Cl$^{-1}$=PtCl$_4$ sublimate The advantage of plasma chlorination over chlorination by chlorine molecules is due to the fact that it can be achieved at temperatures that are much lower than those necessary for thermally-driven chlorination, and the low temperature chlorination process can be more selective with pure chloride for recovering of platinum group metals.

The apparatus of the present invention includes an electromagnetic inductor 28 having electrodes 27 arranged in the housing 21, although an embodiment when the electrodes are arranged outside the housing 21 is also contemplated. The chlorine plasma can, for example, be held in the reaction zone by applying a static magnetic field that can be generated by induction coils 26 arranged in the housing 21, although an embodiment when the induction coils 26 are arranged outside the housing 21 is also contemplated. Application of an electromagnetic field to the chlorine-containing gas mixture, produced as a result of decomposition of the chlorine-containing material, can provide ionization of chlorine and form a chlorine plasma.

Thus, a chemical reaction between platinum group metals and chlorine ions is caused. Examples of such a chemical reaction include, but are not limited to Pd+Cl$_2$=PdCl$_2$↑

Pt+Cl$_2$=PtCl$_2$↑

As a result of the chemical reaction, a volatile platinum group metal-containing chloride product is provided in the reaction zone.

It should be understood that the irradiance of the electromagnetic field in the reaction zone is dependent on the configuration of the apparatus, volume of the catalyst particulate material 25 and pressure of the chlorine-containing gas in the chlorination reactor 22.

The pressure of the chlorine-containing gas mixture in the reaction zone can, for example, be in the range of 1 millibar to 1 bar. Under these conditions, the ionization of chlorine molecules can, for example, be achieved by applying an alternating electromagnetic field to the reaction zone at a frequency in the range of 50 kHz to 12 GHz. An irradiance of the electromagnetic field in the reaction zone can, for example, be in the range of 0.1 kW/cm$^2$ to 10 kW/cm$^2$.

In order to provide ionization of chlorine, the electromagnetic field can, for example, be applied to the chlorine-containing gas for a time period in the range of 5 min to 180 min. The static magnetic field for holding the plasma in the reaction zone can have a strength greater than 0 Tesla but less than 2 Tesla.

According to an embodiment, the heating of the catalyst particulate material in a reaction zone is carried out simultaneously with the applying of an electromagnetic field to the chlorine-containing gas.

The apparatus 20 also includes one or more platinum group metal-containing vapor outlet ports 226 (only one outlet port 226 is shown in FIG. 2), and one or more corresponding cooling manifolds 29 (only one cooling manifold 29 is shown in FIG. 2) through which a platinum group metal-containing vapor is released from the reaction zone 22. The cooling manifold 29 is configured for cooling down the volatile platinum group metal-containing chloride product (i.e., platinum group metal-containing vapor) in order to provide condensation, and thereby to convert the volatile platinum group metal-containing chloride product into solid phase platinum group metal-containing materials.

The cooling manifold 29 can be a tube made of a heat conductive material which is open to atmospheric air and placed at room temperature. In this case, the cooling of the platinum group metal-containing vapor can be carried out during the passing of the material through the cooling manifold 29. When desired, the cooling manifold 29 can be arranged within a dedicated cooling device (not shown).

The apparatus 20 may include a platinum group metal-containing material collector 30 coupled to the platinum group metal-containing vapor outlet port 226 via the cooling manifold 29. The platinum group metal-containing material collector 30 can, for example, be any suitable vessel such as a container, tank, chamber, cartridge, housing, frame or any other structure that can be used for collecting and storing the solid phase materials obtained during condensation of the volatile platinum group metal-containing chloride product in accordance with the teaching of the present invention.

The apparatus 20 may include or be connectable to a control system (not shown) that is coupled to the chlorine-containing gas inlet valve 225 and configured for controlling operation thereof. Likewise, the control system can be adjusted to control operation of the heater 221. Specifically, the signals produced by the temperature sensor 222 can be relayed to the control system via a connecting wire (not shown), or wirelessly. In response to these signals, the control system can generate corresponding control signals to control operation of the heater 221.

Platinum group metal can be recovered from the platinum group metal-containing materials in the solid phase by any recovery means conventional in the art. For example, this may conveniently be achieved by dissolving the platinum group metal-containing condensed solid products in water and treating the solution with metallic zinc to reduce the platinum group metal.

The following examples are given by way of illustration, and therefore should not be construed to limit, in any manner, the scope of the present invention.

Example 1

289 grams of spent catalyst containing 0.45 weight percent of platinum was crushed to obtain a catalyst particulate material. Then the catalyst particulate material was soaked in a chloride aqueous solution containing 27 weight percent of calcium chloride, CaCl$_2$, and 12 weight percent of calcium hypochlorite Ca(ClO)$_2$. Soaking of the catalyst particulate material in the chloride aqueous solution was carried out at atmospheric pressure and room temperature for 10 minutes. The weight of the steeped catalyst particulate material after soaking was 525 grams.

The steeped catalyst particulate material was then subjected to chlorinating treatment at a temperature of 1000 degrees Celsius for one hour by putting the catalyst particulate material in contact with the chlorine containing gas containing 90 weight percent of chlorine and 10 weight percent of air.

A static electromagnetic field having a strength of 1.3 Tesla was applied to the chlorine-containing gas for 10 minutes in a reaction zone containing the catalyst particulate material to provide ionization of chlorine to provide a volatile platinum chloride product in the reaction zone.

The recovery yield for platinum after cooling the volatile platinum chloride product was 94 percent.

Example 2

30 grams of spent catalyst containing 0.45 weight percent of platinum was crushed to obtain a catalyst particulate material. The catalyst particulate material was then soaked in chloride aqueous solution containing 25 weight percent of ammonium chloride, $NH_4Cl$, and 12 weight percent of calcium hypochlorite $Ca(ClO)_2$. Soaking of the catalyst particulate material in the chloride aqueous solution was carried out at atmospheric pressure and room temperature for 10 minutes. The weight of the steeped catalyst particulate material after soaking was 67 grams.

The steeped catalyst particulate material was then subjected to chlorinating treatment at a temperature of 1000 degrees Celsius for one hour by putting the catalyst particulate material in contact with the chlorine containing gas containing 90 weight percent of chlorine and 10 weight percent of air.

A static electromagnetic field having a strength of 1.3 Tesla was applied to the chlorine-containing gas for 10 minutes in a reaction zone containing the catalyst particulate material to provide ionization of chlorine to provide a volatile platinum chloride product in the reaction zone.

The recovery yield for platinum after cooling the volatile platinum chloride product was 83 percent.

Example 3

48 grams of spent catalyst containing 0.45 weight percent of platinum was crushed to obtain a catalyst particulate material. The catalyst particulate material was then soaked in chloride aqueous solution containing 13 weight percent of calcium hypochlorite $Ca(ClO)_2$. The used chloride aqueous solution did not contain any chloride salt. Soaking of the catalyst particulate material in the chloride aqueous solution was carried out at atmospheric pressure and room temperature for 10 minutes. The weight of the steeped catalyst particulate material after soaking was 103 grams.

The steeped catalyst particulate material was then subjected to chlorinating treatment at a temperature of 1000 degrees Celsius for one hour by putting the catalyst particulate material in contact with the chlorine containing gas containing 90 weight percent of chlorine and 10 weight percent of air.

A static electromagnetic field having a strength of 1.3 Tesla was applied to the chlorine-containing gas for 10 minutes in a reaction zone containing the catalyst particulate material to provide ionization of chlorine to provide a volatile platinum chloride product in the reaction zone.

The recovery yield for platinum after cooling the volatile platinum chloride product was 46 weight percent.

Example 4

150 grams of spent catalyst containing 0.45 weight percent of platinum was crushed to obtain a catalyst particulate material. The catalyst particulate material was then soaked in a chloride aqueous solution containing 21 weight percent of calcium chloride, $CaCl_2$. The used chloride aqueous solution did not contain any hypochlorite salt. Soaking of the catalyst particulate material in the chloride aqueous solution was carried out at atmospheric pressure and room temperature for 10 minutes. The weight of the steeped catalyst particulate material after soaking was 241 grams.

The steeped catalyst particulate material was then subjected to chlorinating treatment at a temperature of 1000 degrees Celsius for one hour by putting the catalyst particulate material in contact with the chlorine containing gas containing 90 weight percent of chlorine and 10 weight percent of air.

A static electromagnetic field having a strength of 1.3 Tesla was applied to the chlorine-containing gas for 10 minutes in a reaction zone containing the catalyst particulate material to provide ionization of chlorine to provide a volatile platinum chloride product in the reaction zone.

The recovery yield for platinum after cooling the volatile platinum chloride product was 68 percent.

The above Examples 1-4 illustrate that the recovery yield of the method is greater when the chloride aqueous solution includes both at least one chloride salt and at least one hypochlorite salt in water (Examples 1 and 2), than only at least one chloride salt (Example 4) or only at least one hypochlorite salt (Example 4).

As such, those skilled in the art to which the present invention pertains, can appreciate that while the present invention has been described in terms of preferred embodiments, the conception, upon which this disclosure is based, may readily be utilized as a basis for the designing of other structures systems and processes for carrying out the several purposes of the present invention.

Also, it is to be understood that the phraseology and terminology employed herein are for the purpose of description and should not be regarded as limiting.

Finally, it should be noted that the word "comprising" as used throughout the appended claims is to be interpreted to mean "including but not limited to".

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

What is claimed is:

1. An apparatus for recovery of platinum group metals from a spent catalyst comprising:
    a housing;
    a chlorination reactor with a reaction zone;
    a catalyst particulate material inlet port located in the housing of the apparatus and configured to deliver catalyst particulate material into the chlorination reactor;
    a chlorine-containing gas inlet port located in the housing of the apparatus, connected to the chlorination reactor;
    a heater;
    an electromagnetic inductor inside the chlorination reactor or connected to the chlorination reactor; and
    a platinum group metal-containing vapor outlet port, and one or more corresponding cooling manifolds through which a platinum group metal-containing vapor is released from said reaction zone, wherein the platinum group metal-containing vapor outlet port and the one or more corresponding cooling manifolds are connected to the chlorination reactor;

wherein the catalyst particulate material is fed into said catalyst particulate material inlet port and is treated with chlorine containing gas from said chlorination reactor at a predetermined temperature by said heater, providing a chemical reaction between said chlorine-containing gas and the platinum group metals in the catalyst particulate material to yield a volatile platinum group metal-containing chloride product;

wherein said catalyst particulate material inlet port and said chlorine-containing gas inlet port are configured to direct the catalyst particulate material and the chlorine-containing gas, respectively, into said chlorination reactor;

wherein said heater is in the chlorination reactor and in contact with catalyst particulate material which is fed from the catalyst particulate material inlet port; and wherein said electromagnetic inductor is configured to apply an electromagnetic field in the range of 50 kHz to 12 GHz to a chlorine-containing gas mixture in said chlorination reactor.

2. The apparatus of claim 1, wherein said catalyst particulate material includes particles having a predetermined grain size in the range of 100 microns to 300 mm.

3. The apparatus of claim 1, wherein an amount of the chlorine in said chlorine containing gas is in the range of 1 gram to 200 gram per each kilogram of said spent catalyst.

4. The apparatus of claim 1, wherein said chlorine-containing gas includes chlorine and atmospheric air or oxygen.

5. The apparatus of claim 1, wherein said predetermined temperature is in the range of 300 degrees Celsius to 1100 degrees Celsius.

6. The apparatus of claim 1, wherein said electromagnetic field is in an irradiance in the range of 0.1 $kW/cm^2$ to 10 $kW/cm^2$.

7. The apparatus of claim 1, wherein said application of electromagnetic field is carried out simultaneously with said treatment of said catalyst particulate material with said chlorine containing gas at said predetermined temperature.

8. The apparatus of claim 1, wherein said chlorine-containing gas is provided from a storage tank.

9. The apparatus of claim 1, wherein said electromagnetic inductor comprises electrodes.

10. The apparatus of claim 9, wherein said electrodes are arranged inside or outside a housing.

11. The apparatus of claim 1, wherein said chlorination reactor comprises a temperature sensor.

12. The apparatus of claim 1, further comprising a platinum group metal-containing chloride product collector.

* * * * *